United States Patent [19]

Antos

[11] Patent Number: 5,790,201
[45] Date of Patent: Aug. 4, 1998

[54] TELEVISION AND COMPUTER CAPABILITY INTEGRATION

[76] Inventor: Jeffrey David Antos, 94 Howard Gleason Rd., Cohasset, Mass. 02025

[21] Appl. No.: 695,138

[22] Filed: Aug. 8, 1996

[51] Int. Cl.$^6$ ..................................................... H04N 7/00
[52] U.S. Cl. .................................. 348/552; 348/552
[58] Field of Search ................................... 348/552, 718, 348/719; 395/200.3, 200.47, 200.48; H04N 7/00

[56] References Cited

U.S. PATENT DOCUMENTS

| | | |
|---|---|---|
| D. 288,434 | 2/1987 | Gemmell. |
| 4,800,423 | 1/1989 | Appiano. |
| 5,111,296 | 5/1992 | Duffield. |
| 5,113,259 | 5/1992 | Romesburg. |
| 5,283,819 | 2/1994 | Glick ........................................ 348/552 |
| 5,414,773 | 5/1995 | Handelman. |
| 5,461,667 | 10/1995 | Remillard. |
| 5,488,412 | 1/1996 | Majeti. |
| 5,502,503 | 3/1996 | Kox. |
| 5,512,935 | 4/1996 | Majeti. |
| 5,557,675 | 9/1996 | Schupak ........................................ 348/552 |

*Primary Examiner*—Sherrie Hsia
*Attorney, Agent, or Firm*—Sampson & Associates, P.C.

[57] ABSTRACT

A television and computer integration system is provided that includes a coupler module electrically coupled to a remote keyboard and integral mouse. Coupler module is also electrically coupled to both a personal computer and to a conventional television. The personal computer has a conventional user interface which includes a keyboard, monitor and mouse. The coupler module enables the combination of the remote keyboard and mouse, and television to serve as a secondary user interface for the personal computer which may be operated in parallel with the primary user interface. A user may thus access and take advantage of substantially all of the capabilities of the personal computer (including computer games and Internet access) from the user's television, in the comfort of the user's living room or television room. The present invention thus advantageously provides efficient and inexpensive integration of television capabilities with personal computing, including Internet access.

24 Claims, 1 Drawing Sheet

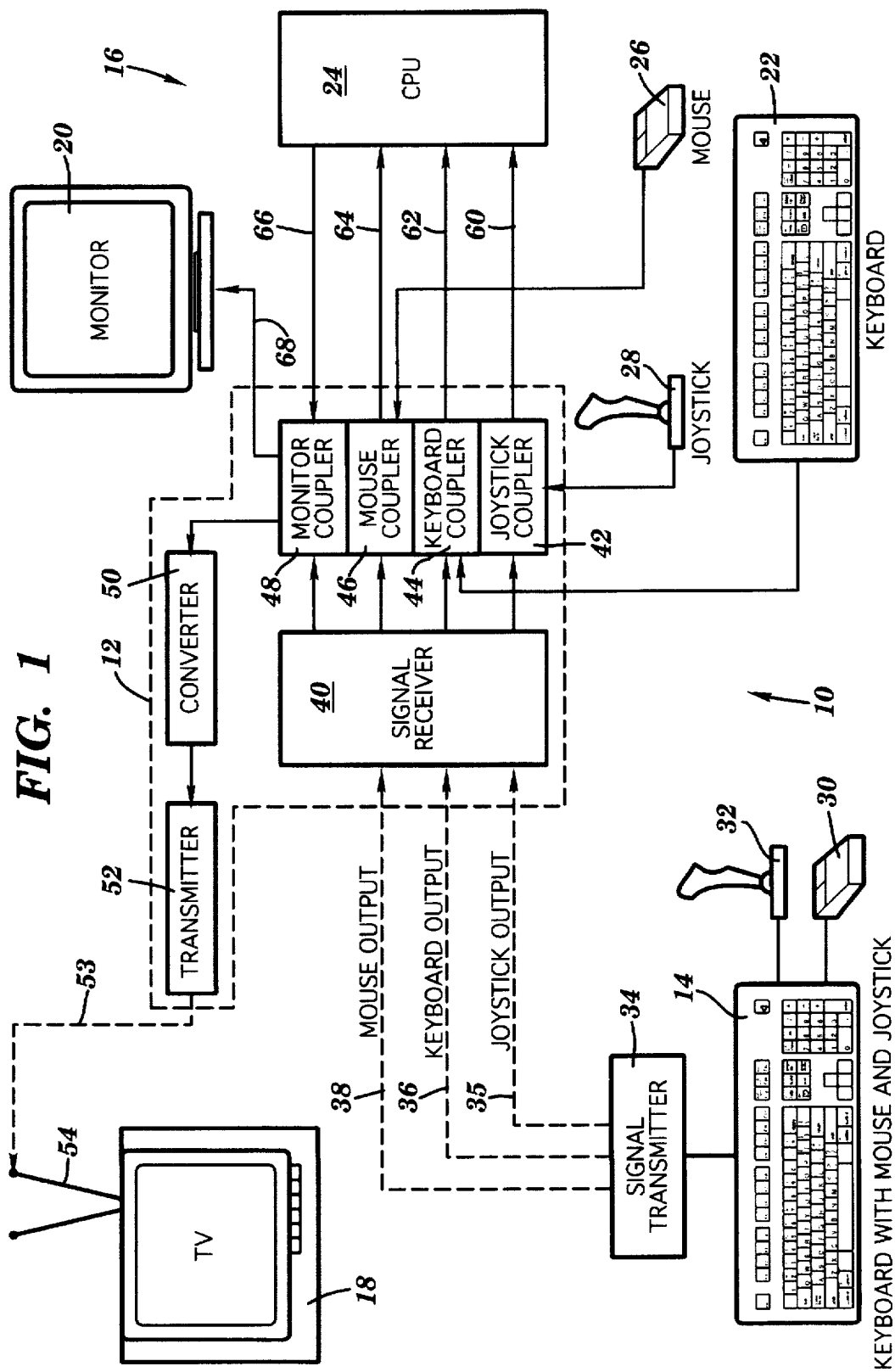

TELEVISION AND COMPUTER CAPABILITY INTEGRATION

BACKGROUND OF THE INVENTION

1. Field of the Invention

This invention relates to multimedia information retrieval and presentation, and more particularly, to a device and method for integrating capabilities of a personal computer with a television.

2. Background Information

Many commercial and public information resources provide convenient access to information such as news, weather, financial, legal and recreational information in electronic form. This information may be accessed, disseminated and otherwise manipulated through such electronic means as electronic mail (e-mail), electronic file transfers and facsimile transmission. Most of these resources and information handling capabilities, as well as a growing number of additional services, are available over the world wide computer network known as the Internet. In particular, a portion of the Internet commonly known as the World Wide Web provides a great deal of such information in a multimedia format, including text, graphics and to an increasing extent, sound.

Conventional equipment for utilizing these resources and capabilities include personal computers such as those manufactured and sold by Apple Computer Inc. of Cupertino, Calif., IBM Corporation of Armonk, N.Y. and various other manufacturers. These personal computers typically include common communication hardware and software. In particular, they are generally capable of being linked to the Internet by an electronic modulator/demodulator device (modem) connected by the public telephone system to a server operated either by the user or by a commercial Internet access provider. Such Internet connectable computers have proliferated in recent years, with recent estimates indicating the presence of anywhere from 10 million to 20 million individual Internet users in the United States alone.

As the trend towards multimedia formatting of Internet information continues, content available over the Internet is expected to approach that of conventional television programming, namely, live action video images combined with sound. In this connection, content such as live broadcast of concerts and sporting events, as well as video conferencing over the Internet, is expected to become increasingly common. Accordingly, it is becoming increasingly desirable to integrate Internet access with televisions for convenient presentation of Internet content.

In this regard, particularly in the wake of recent telecommunications deregulation in the United States, companies active in various communications media, including telephone, cable television and satellite or wireless television, are attempting to combine television programming with links to the Internet. Examples of attempts to provide such integration or consolidation include development of coaxial cable modems to enable CATV companies to provide both Internet access and television programming over existing cable TV lines. Telephone companies are currently developing advanced data compression technologies in hopes of enabling transmission of sufficient bandwidth to provide live action television programming over conventional telephone lines.

These approaches, however, are not without drawbacks. In particular, cable modems are not yet readily available. Similarly, data compression technology capable of providing sufficient bandwidth for television programming has not yet been sufficiently developed for widespread commercial use. Moreover, any such technology designed to facilitate Internet access using a television would likely require the consumer to make a substantial investment in television enhancements such as microprocessors and memory devices, as well as associated software. Disadvantageously, such enhancements would generally be redundant to equipment already resident in a user's personal computer. Furthermore, these enhancements would not necessarily provide the computational and memory capabilities required to perform relatively complex operations, including mathematical, spreadsheet and game playing capabilities currently provided by personal computers. Further still, many users may not wish to replace their personal computers with an integrated television system, preferring instead to maintain separate computer facilities for work related, as opposed to generally recreational functions. This desire would disadvantageously tend to necessitate ownership of both a relatively expensive enhanced television as well as largely separate and duplicative personal computing facilities.

Thus, a need exists for relatively simple and inexpensive means for integrating television capabilities with capabilities of a personal computer.

SUMMARY OF THE INVENTION

According to an embodiment of this invention, an interconnect device is adapted to link a television with a personal computer having a CPU and a user interface including a monitor and a keyboard, to integrate capabilities of the television and the personal computer. The interconnect device includes at least one video input means for receiving a video output signal from the CPU and first video output means for coupling the video output signal to the television for display on the television. The interconnect device also includes an other keyboard and a first keyboard input means for receiving an output signal from the other keyboard. At least one keyboard output means is provided for coupling the output signal from the other keyboard to the CPU so that the other keyboard and the television serve as a remote user interface to the personal computer.

The present invention provides, in a second aspect, a method of integrating capabilities of a television and a personal computer having a CPU and a user interface including a monitor and a keyboard. The method includes the steps of providing an other keyboard adapted for use proximate the television, coupling a video output signal from the CPU with the television for display thereof on the television and coupling an output signal from the other keyboard to the CPU, so that the other keyboard and the television serve as an other user interface of the personal computer.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 1 is a block diagram of a preferred embodiment of a television programming and computer integration system of the present invention.

DETAILED DESCRIPTION OF THE PREFERRED EMBODIMENTS

Briefly described, as shown in FIG. 1, a television and computer integration system 10 of the present invention includes a coupler module 12 electrically coupled to a remote keyboard 14. Coupler module 12 is also electrically coupled to both a personal computer 16 and to a conventional television (TV) 18. The coupler module enables the combination of remote keyboard 14 and television 18 to serve as a secondary user interface for personal computer 16. This secondary user interface is disposed in parallel to a primary user interface which generally includes a conventional monitor 20 and computer keyboard 22, as well as other common peripherals. A user may thus access and take advantage of substantially all of the capabilities of the personal computer (including computer games and Internet access) from the user's television, in the comfort of the user's living room or television room. In this manner, the present invention advantageously provides efficient and inexpensive integration of television capabilities with the power of personal computing including Internet access.

Referring now to FIG. 1 in detail, conventional personal computer 16 includes CPU 24 and a primary user interface which generally includes monitor 20, computer keyboard 22, and additional common peripherals such as a mouse 26 and joystick 28. Preferably, each component of the primary user interface is electrically coupled directly to coupler module 12, while coupler module 12, in turn, is electrically coupled to standard ports (not shown) of CPU 24, as will be discussed in greater detail hereinafter.

Remote keyboard 14 is of generally conventional construction and preferably includes an integral mouse 30 and integral joystick 32 electrically coupled thereto as shown. Integral mouse 30 and integral joystick 32 may be of any conventional configuration, such as, for example, common desktop configurations as depicted in FIG. 1. In an alternative embodiment (not shown), integral mouse 30 may be of the type commonly used in laptop or notebook computers, generally comprising a rotatable ball or flexible cylinder disposed directly on remote keyboard 14 for manipulation by a user's thumb. Integral joystick 32 may be similarly disposed directly on remote keyboard 14.

The remote keyboard is electrically coupled to coupler module 12, preferably in a wireless manner as indicated by phantom representations of joystick output signal 35, keyboard output signal 36 and mouse output signal 38. As also shown, such wireless coupling may be accomplished by a suitable signal transmitter 34, preferably disposed integrally with remote keyboard 14. Signal transmitter 34 serves to transmit conventional joystick output signal 35, keyboard output signal 36 and mouse output signal 38 to a suitable signal receiver 40 of coupler module 12, as will be discussed in greater detail hereinafter. Transmitter 34 and receiver 40 may be of any suitable conventional construction, such as, for example, conventional 900 Mhz equipment commonly used in wireless household appliances such as cordless telephones.

One skilled in the art will recognize that in the event remote keyboard 14 is wirelessly coupled to coupler module 12, as shown, remote keyboard 14, as well as integral mouse 30 and integral joystick 32, will not receive power from the CPU in the manner common to conventional personal computers. Thus, in this preferred embodiment, remote keyboard 14, including integral mouse 30, integral joystick 32 and signal transmitter 34, is provided with a suitable power supply (not shown), such as an integral battery pack or a transformer adapted for connection to a conventional AC electrical outlet.

Television 18 is coupled to coupler module 12 in a conventional manner, such as with a coaxial cable link, or alternatively, in a wireless manner as indicated by TV signal 53 shown in phantom and as will be discussed in greater detail hereinafter.

Coupler module 12 generally includes a signal receiver 40, joystick coupler 42, keyboard coupler 44, mouse coupler 46 and monitor coupler 48, as well as a converter 50 and transmitter 52. Signal receiver 40 is of any suitable conventional configuration adapted to receive joystick output signal 35, keyboard output signal 36 and mouse output signal 38 transmitted by signal transmitter 34 as discussed hereinabove, and couple these signals to joystick coupler 42, keyboard coupler 44 and mouse coupler 46, respectively. Preferably, joystick coupler 42, keyboard coupler 44 and mouse coupler 46 are respectively provided with joystick, keyboard and mouse input ports (not shown), of the type commonly provided on a CPU. These input ports facilitate pluggable receipt of joystick 28, computer keyboard 22 and mouse 26, respectively. In addition, output ports (not shown) of the joystick coupler, keyboard coupler and mouse coupler are each connected to cables 60, 62 and 64, respectively, having conventional connectors (not shown) adapted to pluggably interconnect with the conventional joystick, keyboard and mouse input ports, respectively, of CPU 24. Joystick coupler 42, keyboard coupler 44 and mouse coupler 46 thus each serve as Tee junctions or conventional signal splitters, each of which serve to connect a pair of input devices, namely, keyboards 14 and 22, joysticks 32 and 28 and mice 30 and 26, to the CPU in parallel with one another. In this manner, the CPU is able to receive signals and thus be operated from the input devices of either the primary user interface or the secondary user interface of remote keyboard 14.

In an alternate embodiment, additional couplers having substantially similar construction to those discussed hereinabove, may be provided to facilitate use of any number of additional peripheral devices, such as, for example, electronic pens or digitizers.

In an additional embodiment, diodes (not shown) may be provided in the signal paths of the input devices at predetermined locations upstream of the couplers to prevent signals from an input device of one of the user interfaces from feeding back into the parallel input device of the other user interface. Moreover, a conventional interlock circuit (not shown) may be provided to prevent simultaneous use of the individual parallel input devices.

Monitor coupler 48 is substantially similar to couplers 42, 44 and 46, with the primary exception that monitor coupler 48 is adapted to connect a single input signal to parallel outputs, rather than to connect parallel inputs to a single output. Monitor coupler 48 is provided with an input cable 66 which includes a conventional connector (not shown) adapted to pluggably interconnect with a conventional video output port (not shown) of CPU 24. In addition, an output port of monitor coupler 48 preferably comprises a conventional video connector (not shown) of the type adapted to pluggably receive conventional monitor cable 68 to facilitate coupling with monitor 20 as shown. Monitor coupler 48 is connected at an other output port (not shown) to converter 50. Converter 50 serves to convert the video output signal generated by CPU 24 and which passes through monitor coupler 48, to a form capable of being received and displayed by TV 18. In a preferred embodiment, converter 50 generally comprises a conventional digital to analog converter adapted to convert the digital video signal generated by CPU 24, to a conventional analog signal of the type generally receivable by conventional televisions such as TV 18. An example of suitable converter is sold under the trademark TVator™ by Antec Inc. of Fremont, Calif.

Converter 50 may be connected, in a conventional manner such as by coaxial cable, to TV 18. Alternatively, in a preferred embodiment, converter 50 may be wirelessly coupled to TV 18. In this regard, as shown, converter 50 is coupled to a transmitter 52 which preferably comprises a conventional VHF or UHF transmitter capable of broadcasting the video signal received from converter 50 to a conventional antenna 54 coupled to TV 18. In a preferred embodiment, transmitter 52 may be a relatively low power device adapted for in-home use, and antenna 54 may be connected to a conventional receiver (not shown) switched in a known manner to a standard input terminal (not shown) of TV 18. For example, a conventional Tee junction or signal splitter may be used to connect the receiver to the TV in parallel with a conventional cable television coaxial cable. In this manner, a user may display and view the signal broadcast by transmitter 52 simply by tuning TV 18 to a predetermined TV channel. An example of a transmitter and receiver that may be utilized in this regard is sold under the designation "JR Audiovisual transmitter/receiver" by RF Link Company of California, U.S.A.

In a further embodiment, in the event personal computer 16 is equipped with audio capabilities, including an audio output terminal and audio speakers, coupler module 12 may include an audio coupler (not shown), substantially similar to monitor coupler 48. The audio coupler may thus be adapted to connect to the audio output terminal of CPU 24, while also being connectable to the computer's audio speakers. The audio coupler would also be connectable to a converter (not shown) similar in function to converter 50, which would serve to convert the audio signal into a form capable of being transmitted by transmitter 52 to TV 18 along with the video signal.

In a further embodiment of the present invention, remote keyboard 14 may be provided with an On/Off switch (not shown) and associated conventional circuitry adapted to remotely activate CPU 24, coupler module 12 and TV 18. This may be accomplished in any convenient manner. For example, remote keyboard 14 may be provided with a conventional infra-red (IR) transmitter (not shown) of the type commonly used in television remotes, to enable a user to conveniently operate TV 18. Radio frequency (RF) signals are preferably utilized to turn coupler module 12 and personal computer 16 on and off remotely, to permit them to be located out of line-of-sight with remote keyboard 14. Thus, signal transmitter 34, of remote keyboard 14, may be adapted to transmit an additional signal to signal receiver 40 to in turn, actuate a relay or similar device capable of turning coupler module 12 on and off. The power supply to CPU 24 may conveniently be routed through the coupler module in any convenient manner, so that the CPU is turned on and off in tandem with coupler module.

A preferred embodiment of the invention having been fully described, the following is a description of the operation thereof.

The first step in the operation of the present invention is to supply power to remote keyboard 14. A user may then turn on personal computer 16, coupler module 12 and TV 18, either directly by their conventional On/Off switches, or by use of the aforementioned remote switching means associated with remote keyboard 14. Once so activated, TV 18 may be operated in a conventional manner to view conventional television programming. In addition, however, the user may switch the TV to the aforementioned predetermined channel, such as 3 or 4, to display the video signals supplied by personal computer 16, which originate at CPU 24 and are fed to TV 18 through monitor coupler 48, then converter 50 and transmitter 52. In an alternative embodiment described hereinabove, any audio signals supplied by personal computer 16 may be similarly received by the TV and presented by the TV's audio speaker(s).

The user may, in turn, operate personal computer 16 by remote keyboard 14. In this regard, any user input provided to the remote keyboard, either by keystroke, or manipulation of integral mouse 30, integral joystick 32 or any other peripheral, will be transmitted by signal transmitter 34 to signal receiver 40. The signals will then pass to CPU 24 through joystick coupler 42, keyboard coupler 44, mouse coupler 46, or other peripheral coupler as discussed hereinabove.

In this manner, a user may conveniently operate personal computer 16 from the user's television room without having to physically locate the computer in the room. Indeed, the personal computer may be located in another room in the home, such as a study or office where it may be more desirably located for work related computing activities. The present invention thus integrates the computer's capabilities with those of the television. In this regard, by utilizing a standard television in combination with remote keyboard 14 to provide a nominally complete parallel user interface, a user may access virtually any capability of personal computer 16, including computer games, CD ROMS and Internet access in the event the computer is so equipped. This may be accomplished without requiring the user to either purchase duplicate hardware and software, or transport the personal computer into the television or family room.

Moreover, a user also has the ability to operate the computer in a conventional manner from the primary user interface, namely, computer keyboard 22, monitor 20 and peripherals such as mouse 26 and joystick 28. In this connection, the aforementioned optional interlock means may be utilized to prevent both user interfaces from simultaneously providing input signals to CPU 24.

Although a preferred embodiment of the invention has been shown and described having various componentry electrically coupled to one another by hard-wired and/or wireless connections, it should be understood by those skilled in the art that any means for coupling the various componentry, including, but not limited to coupling means integrally disposed within a dwelling or office environment, such as an electronic or fiber optic home network, may be utilized without departing from the spirit and scope of the invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. An interconnect device adapted to link a television with a personal computer having a CPU and a user interface including a monitor and a keyboard, to integrate capabilities of the television and the personal computer, said interconnect device comprising:

at least one video input means for receiving a video output signal from the CPU;

first video output means for coupling the video output signal to the television for display on the television;

a first keyboard input means for receiving an output signal from an other keyboard; and at least one keyboard output means for coupling the output signal from the other keyboard to the CPU;

wherein the other keyboard and the television serve as a remote user interface to the personal computer.

2. The interconnect device as set forth in claim 1, further comprising a converter connected between the CPU and the television, said converter being adapted to convert the video output signal to a form capable of being displayed by the television.

3. The interconnect device as set forth in claim 2, wherein said converter further comprises a digital to analog converter adapted to convert the video output signal from digital to analog.

4. The interconnect device as set forth in claim 2, further comprising a transmitter connected between said converter and the television, wherein said interconnect device is wirelessly coupled to the television.

5. The interconnect device as set forth in claim 4, further comprising the other keyboard, a signal transmitter and a signal receiver connected between the CPU and said other keyboard, wherein said other keyboard is wirelessly coupled to the CPU.

6. The interconnect device as set forth in claim 5, where in said signal transmitter is disposed proximate said other keyboard and said signal receiver is disposed proximate the CPU.

7. The interconnect device as set forth in claim 1, further comprising a mouse and a first mouse input means for receiving an output signal from said mouse and a mouse output means for coupling the output signal from said mouse to the CPU.

8. The interconnect device as set forth in claim 7, further comprising a joystick and a joystick input means for receiving an output signal from said joystick and a joystick output means for coupling the output signal from said joystick to the CPU.

9. The interconnect device as set forth in claim 8, wherein said mouse and said joystick are disposed integrally with said other keyboard.

10. The interconnect device as set forth in claim 1, further comprising a second video output means for coupling the video output signal to the monitor, wherein the video output signal is adapted for display on the monitor and the television.

11. The interconnect device as set forth in claim 10, further comprising a second keyboard input means for receiving an output signal from the keyboard and coupling the output signal from the keyboard to said at least one keyboard output means, wherein said at least one keyboard output means couples both the output signal from the keyboard and the output signal from the other keyboard to the CPU.

12. The interconnect device as set forth in claim 11, further comprising:
a mouse and a first mouse input means for receiving an output signal from said mouse and at least one mouse output means for coupling the output signal from said mouse to the CPU;
a second mouse input means for receiving an output signal from an other mouse and coupling the output signal from the other mouse to said at least one mouse output means, wherein said at least one mouse output means couples both the output signal from said mouse and the output signal from the other mouse to the CPU.

13. A method of integrating capabilities of a television and a personal computer having a CPU and a user interface including a monitor and a keyboard, the method comprising the steps of:
providing an other keyboard adapted for use proximate the television;
coupling a video output signal from the CPU with the television for display thereof on the television; and
coupling an output signal from the other keyboard to the CPU, wherein the other keyboard and the television serve as an other user interface of the personal computer.

14. The method as set forth in claim 13, wherein said step of coupling a video output signal from the CPU with the television further comprises the step of converting the video output signal to a form capable of being displayed by the television.

15. The method as set forth in claim 14, wherein said step of converting the video output signal further comprises the step of converting the video output signal from digital to analog.

16. The method as set forth in claim 14, wherein said step of coupling a video output signal from the CPU with the television further comprises the step of wirelessly transmitting the video output signal from the CPU to the television.

17. The method as set forth in claim 16, wherein said step of coupling an output signal from the other keyboard to the CPU further comprises the step of wirelessly transmitting the output signal from the other keyboard using a signal transmitter disposed proximate the other keyboard and receiving the output signal from the other keyboard with a signal receiver disposed proximate the CPU.

18. The method as set forth in claim 13, further comprising the steps of:
providing a mouse adapted for operation in combination with the other keyboard;
receiving a mouse output signal from the mouse; and
coupling the mouse output signal from the mouse to the CPU.

19. The method as set forth in claim 18, further comprising the steps of:
providing a joystick adapted for operation in combination with the other keyboard;
receiving a joystick output signal from the joystick; and
coupling the joystick output signal from the joystick to the CPU.

20. The method as set forth in claim 19, wherein the mouse and the joystick are disposed integrally with the other keyboard.

21. The method as set forth in claim 13, further comprising the step of coupling the video output signal to the monitor, wherein the video output signal is adapted for display on the monitor and the television.

22. The method as set forth in claim 21, further comprising the step of coupling an output signal from the keyboard to the CPU, wherein both the output signal from the keyboard and the output signal from the other keyboard are coupled to the CPU.

23. The method as set forth in claim 22, further comprising the steps of:
providing a mouse and a first mouse input means for receiving an output signal from the mouse and at least one mouse output means for coupling the output signal from the mouse to the CPU;
receiving an output signal from an other mouse and coupling an output signal from the other mouse to the CPU, wherein both the output signal from the mouse and the output signal from the other mouse are coupled to the CPU.

24. An interconnect device adapted to link a television with a personal computer having a CPU and a user interface including a monitor, keyboard and a mouse, to integrate capabilities of the television and the personal computer, the interconnect device comprising:

an other keyboard;

at least one video input means for receiving a video output signal from the CPU;

first video output means for coupling the video output signal to the television for display on the television;

second video output means for coupling the video output signal to the monitor;

a first keyboard input means for receiving an output signal from said other keyboard;

at least one keyboard output means for coupling the output signal from said other keyboard to the CPU;

a second keyboard input means for receiving an output signal from the keyboard and coupling the output signal from the keyboard to said at least one keyboard output means;

an other mouse;

a first mouse input means for receiving an output signal from said other mouse; and at least one mouse output means for coupling the output signal from said other mouse to the CPU; and a second mouse input means for receiving an output signal from the mouse and coupling the output signal from the mouse to said at least one mouse output means;

wherein said other keyboard, said other mouse and the television serve as a remote user interface for the personal computer.

* * * * *